(12) United States Patent
Lopez et al.

(10) Patent No.: US 8,465,873 B2
(45) Date of Patent: Jun. 18, 2013

(54) POSITIVE ELECTRODE MATERIALS FOR HIGH DISCHARGE CAPACITY LITHIUM ION BATTERIES

(75) Inventors: Herman Lopez, Sunnyvale, CA (US); Subramanian Venkatachalam, Fremont, CA (US); Sujeet Kumar, Newark, CA (US); Deepak Kumaar Karthikeyan, San Mateo, CA (US)

(73) Assignee: Envia Systems, Inc., Newark, CA (US)

( * ) Notice: Subject to any disclaimer, the term of this patent is extended or adjusted under 35 U.S.C. 154(b) by 783 days.

(21) Appl. No.: 12/332,735

(22) Filed: Dec. 11, 2008

(65) Prior Publication Data
US 2010/0151332 A1 Jun. 17, 2010

(51) Int. Cl.
*H01M 4/58* (2010.01)
*H01M 4/86* (2006.01)

(52) U.S. Cl.
USPC ............. 429/231.95; 429/218.1; 429/527; 252/182.1

(58) Field of Classification Search
USPC ................................. 429/231.95, 218.1, 527
See application file for complete search history.

(56) References Cited

U.S. PATENT DOCUMENTS

| | | |
|---|---|---|
| 4,957,543 A | 9/1990 | Babjak et al. |
| 5,374,491 A | 12/1994 | Brannan et al. |
| 5,658,693 A | 8/1997 | Thackeray et al. |
| 5,674,645 A | 10/1997 | Amatucci et al. |
| 5,738,907 A | 4/1998 | Vaccaro et al. |
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,337,156 B1 | 1/2002 | Narang et al. |
| 6,372,385 B1 | 4/2002 | Kweon et al. |
| 6,383,687 B1 | 5/2002 | Gibbons et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,528,208 B1 | 3/2003 | Thackeray et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,730,429 B2 | 5/2004 | Thackeray et al. |
| 6,749,648 B1 | 6/2004 | Kumar et al. |
| 6,855,460 B2 | 2/2005 | Vaughey et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,229,717 B2 | 6/2007 | Yamaguchi et al. |
| 7,252,907 B2 | 8/2007 | Takeuchi et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0114995 A1 | 8/2002 | Thackeray et al. |
| 2003/0082448 A1* | 5/2003 | Cho et al. .................. 429/218.1 |

(Continued)

FOREIGN PATENT DOCUMENTS

| | | |
|---|---|---|
| EP | 2264814 A1 | 12/2010 |
| JP | 57065674 A2 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 2002-110167 | 4/2002 |
| JP | 3506397 | 12/2003 |
| JP | 2006-134816 A | 5/2006 |
| JP | 2006-344425 A | 12/2006 |

(Continued)

OTHER PUBLICATIONS

S. Jouanneau et al., "Influence of LiF Additions on Li.NixCo1Á2xMnx.O2 Materials Sintering, Structure, and Lithium Insertion Properties", Journal of the Electrochemical Society, 151, 10, A1749-A1754, 2004.*

(Continued)

*Primary Examiner* — Patrick Ryan
*Assistant Examiner* — Ladan Mohaddes
(74) *Attorney, Agent, or Firm* — Dardi & Herbert, PLLC; Peter S. Dardi

(57) ABSTRACT

Positive electrode active materials are described that have a high tap density and high specific discharge capacity upon cycling at room temperature and at a moderate discharge rate. Some materials of interest have the formula $Li_{1+x}Ni_\alpha Mn_\beta Co_\gamma O_2$, where x ranges from about 0.05 to about 0.25, $\alpha$ ranges from about 0.1 to about 0.4, $\beta$ ranges from about 0.4 to about 0.65, and $\gamma$ ranges from about 0.05 to about 0.3. The materials can be coated with a metal fluoride to improve the performance of the materials especially upon cycling. Also, the coated materials can exhibit a very significant decrease in the irreversible capacity lose upon the first charge and discharge of the battery.

11 Claims, 10 Drawing Sheets

U.S. PATENT DOCUMENTS

| | | | |
|---|---|---|---|
| 2003/0087155 | A1 | 5/2003 | Cho et al. |
| 2003/0108790 | A1 | 6/2003 | Manthiram et al. |
| 2004/0076884 | A1 | 4/2004 | Lee et al. |
| 2004/0091779 | A1 | 5/2004 | Kang et al. |
| 2005/0031942 | A1 | 2/2005 | Hennige et al. |
| 2005/0202316 | A1 | 9/2005 | Hwang et al. |
| 2006/0051671 | A1 | 3/2006 | Thackeray et al. |
| 2006/0051673 | A1 | 3/2006 | Johnson et al. |
| 2006/0083991 | A1 | 4/2006 | Ahn et al. |
| 2006/0147809 | A1 | 7/2006 | Amine et al. |
| 2006/0188781 | A1 | 8/2006 | Thackeray et al. |
| 2006/0257743 | A1 | 11/2006 | Kuratomi et al. |
| 2006/0275667 | A1 | 12/2006 | Watanabe et al. |
| 2007/0072080 | A1 | 3/2007 | Inagaki et al. |
| 2007/0111098 | A1 | 5/2007 | Yang Kook et al. |
| 2007/0148544 | A1 | 6/2007 | Le |
| 2007/0202405 | A1 | 8/2007 | Shizuka et al. |
| 2007/0292757 | A1 | 12/2007 | Watanabe et al. |
| 2008/0102369 | A1 | 5/2008 | Sakata et al. |
| 2008/0107968 | A1 | 5/2008 | Patoux et al. |
| 2008/0118847 | A1 | 5/2008 | Jung et al. |
| 2008/0135802 | A1 | 6/2008 | Saito et al. |
| 2008/0157027 | A1 | 7/2008 | Manthiram et al. |
| 2008/0193841 | A1 | 8/2008 | Sun et al. |
| 2008/0241693 | A1 | 10/2008 | Fukuchi et al. |
| 2008/0268347 | A1 | 10/2008 | Ohzuku et al. |
| 2009/0087362 | A1 | 4/2009 | Sun et al. |
| 2009/0155694 | A1 | 6/2009 | Park |
| 2009/0263707 | A1 | 10/2009 | Buckley et al. |
| 2009/0297947 | A1* | 12/2009 | Deng et al. .................. 429/218.1 |
| 2009/0305131 | A1 | 12/2009 | Kumar et al. |
| 2010/0086853 | A1 | 4/2010 | Venkatachalam et al. |
| 2010/0086854 | A1 | 4/2010 | Kumar et al. |
| 2010/0119942 | A1 | 5/2010 | Kumar |
| 2011/0017528 | A1 | 1/2011 | Kumar et al. |
| 2011/0052981 | A1 | 3/2011 | Lopez et al. |
| 2011/0052989 | A1 | 3/2011 | Venkatachalam et al. |
| 2011/0076556 | A1 | 3/2011 | Karthikeyan et al. |
| 2011/0111294 | A1 | 5/2011 | Lopez et al. |
| 2011/0111298 | A1 | 5/2011 | Lopez et al. |
| 2011/0136019 | A1 | 6/2011 | Amiruddin et al. |
| 2011/0236751 | A1 | 9/2011 | Amiruddin et al. |
| 2011/0244331 | A1 | 10/2011 | Karthikeyan et al. |
| 2012/0028105 | A1 | 2/2012 | Kumar et al. |
| 2012/0056590 | A1 | 3/2012 | Amiruddin et al. |
| 2012/0070725 | A1 | 3/2012 | Venkatachalam et al. |

FOREIGN PATENT DOCUMENTS

| | | |
|---|---|---|
| JP | 2007-220630 A | 8/2007 |
| JP | 3276451 | 2/2008 |
| JP | 2008-536285 A | 9/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 | 4/2008 |
| KR | 10-2008-0099132 A | 11/2008 |
| KR | 10-2009-0078128 A | 7/2009 |
| WO | 99/60638 A1 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006109930 A1 | 10/2006 |
| WO | 2006/137673 A1 | 12/2006 |
| WO | 2008086041 A1 | 7/2008 |

OTHER PUBLICATIONS

Fey et al., "Saturated linear dicarboxylic acids as chelating agents for the sol-gel synthesis of LiNi0.8Co2O2," Materials Chemistry and Physics, 87 (2004) 246-255.

Lee et al., "High capacity Li[Li0.2Ni0.2Mn0.6]O2 cathode materials via a carbonate co-precipitation method," J. of Power Sources, 162 (2006), 1346-1350.

Sun et al, "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Thackeray et al., "Comments on the structural complexity of lithium-rich Li1+xM1−xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Quantachrome Corporation, Brochure for Quantachrome Instruments Autotap device (2007).

Venkatachalam et al., pending U.S. Appl. No. 12/246,814, "Positive Electrode Material for Lithium Ion Batteries Having a High Specific Discharge Capacity and Processes for the Synthesis of These Materials," filed Oct. 7, 2008.

Buckley et al., pending U.S. Appl. No. 61/124,407, "High Energy Lithium Ion Secondary Batteries," filed Apr. 16, 2008.

Kumar, pending U.S. Appl. No. 61/101,432, "Layered Lithium Metal Oxide Cathode Battery Materials with High Energy Density," filed Sep. 30, 2008.

Hwang et al. "Influence of Mn content on the morphology and electrochemical performance of LiNi1-x-yCoxMnyO2 cathode materials," J. Mater. Chem. 2003; 13:1962-1968.

Thackeray et al., "Li2MnO3-stabilized LiMO2 (M=Mn, Ni, Co) electrodes for lithium-ion batteries," J. Mater. Chem., 2007; 17:3112-3125.

International Search Report and Written Opinions for PCT/US2009/066200 dated Jun. 25, 2010.

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Aurbach et al., "On the capacity fading of LiCoO2 intercalation electrodes: the effect of cycling, storage, temperature, and surface film forming additives," Electrochimica Acta 47 (2002) 4291-4306.

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina derived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Ho et al., "Application of A-C Techniques to the Study of Lithium Diffusion in Tungsten Trioxide Thin Films," J. Electrochem. Soc., 1980; 127(2):343-350.

Ito et al., "The relationship between crystal structure and the electrochemical reaction of Li-rich insertion materials (2)" 2010.

Johnson et al. "The significance of the Li2MnO3 component in 'composite' xLi2MnO3 • (1-x)LiMn0.5Ni0.5O2 electrodes," Electrochemistry Communications 6 (2004) 1085-1091.

Kang et al., "Enhancing the rate capability of high capacity xLi2MnO3 • (1-x)LiMO2 (M=Mn, Ni, Co) electrodes by Li-Ni-PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).

Kim et al., "Electrochemical and Structural Properties of xLi2M'O3-(1-x)LiMn0.5Ni0.5O2 Electrodes for Lithium Batteries (M'=Ti, Mn, Zr; 0<x<0.3)" Chem. Mater. 2004, 16, 1996-2006.

Kim et al., "Electrochemical Stability of Thin-Film LiCoO2 Cathodes by Aluminum-Oxide Coating," Chem. Mater. 2003, 15(7):1505-1511.

Lee et al., "Electrochemical characteristics of Al2O3-coated lithium manganese spinel as a cathode material for a lithium secondary battery," J. of Power Sources 126 (2004) 150-155.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010.

Park et al., "Lithium-manganese-nickel-oxide electrodes with integrated layered-spinel structures for lithium batteries," Electrochemistry Communications 9 (2007) 262-268.

Song et al., "Two- and three-electrode impedance spectroscopy of lithium-ion batteries," J. of Power Sources, 2002; 111:255-267.

Sun et al., "The preparation and electrochemical performance of solid solutions LiCoO2-Li2MnO3 as cathode materials for lithium ion batteries," J of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Advances in manganese-oxide 'composite' electrodes for lithium-ion batteries," J. Mater. Chem., 2005,15, 2257-2267.

Yabuuchi et al., "Study of LiMnO3-Li(Co1/3Ni1/3Mn1/3)O2 for High Capacity Positive Electrode Material: II. Redox Reaction at the Positive Electrode/Electrolyte Interface," 2010.

Yoshii et al., "Study of LiMnO3-Li(Co1/3Ni1/3Mn1/3)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Boulineau et al., "Reinvestigation of Li2MnO3 Structure: Electron Diffraction and High Resolution TEM," Chem. Mater. 2009, 21, 4216-4222.

Hong et al., "Structural evolution of layered Li1.2Ni0.2Mn0.6O2 upon electrochemical cycling in a Li rechargeable battery," J. Mater. Chem., 2010, 20, 10179-10186.

Johnson et al., "Lithium-manganese oxide electrodes with layered-spinel composite structures xLi2MnO3 • (1-x)Li1+yMn2-yO4 (0<x<y<0.33) for lithium batteries," Electrochemistry Communications 7 (2005) 528-536.

Park et al., "Physical and electrochemical properties of spherical Li1+x(Ni1/3Co1/3Mn1/3)1-xO2 cathode materials," Journal of Power Sources 177 (2008) 177-183.

Robertson et al., "Mechanism of Electrochemical Activity in Li2MnO3," Chem. Mater. 2003, 15, 1984-1992.

Yabuuchi et al., "Detailed Studies of a High-Capacity Electrode Material for Rechargeable Batteries, Li2MnO3-LiCo1/3Ni1/3Mn1/3O2," J. Am. Chem. Soc. 2011, 133, 4404-4419.

Kang et al., "The Effects of Acid Treatment on the Electrochemical Properties of 0.5 Li2MnO3-0.5 LiNi0.44Co0.25Mn.03O2 Electrodes in Lithium Cells," Journal of the Electrochemical Society 153(6):A1186-A1192 (2006).

Ito et al., "Cyclic deterioration and it's improvement for Li-rich layered cathode material Li [Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Shin et al., "Improvement of electrochemical properties of Li[Ni0.4Co0.2Mn(0.4-x)]O2-yFy cathode materials at high voltage region", Electrochimica Acta 52 1477-1482 (2006).

Extended European Search Report for corresponding European Patent Application No. 09832387.6, dated Oct. 15, 2012.

* cited by examiner b)

a)

US 8,465,873 B2

POSITIVE ELECTRODE MATERIALS FOR HIGH DISCHARGE CAPACITY LITHIUM ION BATTERIES

FIELD OF THE INVENTION

The invention relates to positive electrode active materials for lithium secondary batteries that provide high tap density and high specific discharge capacities. Furthermore, the invention relates to high specific discharge capacity compositions with a metal fluoride coating that significantly stabilizes and increases the discharge capacity during cycling. In general, the positive electrode materials and compositions have high specific capacity with a layered structure and high tap density.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In one aspect, the invention relates to positive electrode active material for lithium ion battery. The material generally has a $10^{th}$ cycle specific discharge capacity of at least 235 mAh/g at room temperature and a tap density of at least 1.8 g/mL. The specific discharge capacity is determined at a discharge rate of C/3 when discharged from 4.6 volts to 2.0 volts. In some embodiments, the positive electrode active material comprises a composition with a formula of $xLiMO_2 \cdot (1-x) Li_2M'O_3$, where M represents one or more metal ions having an average valance of +3 and M' represents one or more metal ions having an average valance of +4 and $0<x<1$. For example, M' can comprise Mn and M can comprise Mn, Co and Ni. In some other embodiments, the positive electrode active material comprises a first material having the formula $xLiMO_2 (1-x) Li_2M'O_3$ and a metal fluoride coating of the said material.

In further embodiments, the positive electrode material comprises a composition with a formula $Li_{1+x}Ni_\alpha Mn_\beta Co_\gamma M''_\delta O_{2-z}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M'' is Mg, Zn, Al, Ga, B, Zr, Ti, Ca, Ce, Y, Nb or combinations thereof. The positive electrode material can comprise a composition with a formula $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3. In one embodiment, the material comprises a composition with a formula $Li_{1.2}Ni_{0.175}Co_{0.10}Mn_{0.525}O_2$.

In some embodiments, the positive electrode active material comprises from about 0.1 mole percent to about 4 mole percent metal fluoride, which can be a coating material. In particular, the metal fluoride can comprise $AlF_3$. In some embodiments, the positive electrode active material has a $10^{th}$ cycle specific discharge capacity from about 240 mAh/g to about 310 mAh/g at room temperature. In additional embodiments, the positive electrode active material has a $10^{th}$ cycle specific discharge capacity from about 250 mAh/g to about 290 mAh/g at room temperature. The specific discharge capacity is determined at a discharge rate of C/3 when discharged from 4.6 volts to 2.0 volts. In some embodiments, the material has a tap density of at least 2.0 g/mL.

In another aspect, the invention is related to a positive electrode active material for a lithium ion battery comprises a layered lithium metal oxide composite comprising +4 metal cations, +3 metal cations and +2 metal cations within a crystalline lattice and a metal/metalloid fluoride coating on said composite. The first cycle irreversible capacity loss of the material is no more than about ⅔ of the first cycle irreversible capacity loss of the uncoated layered lithium metal oxide composite, when both are cycled at discharge rate of C/10. The $20^{th}$ cycle discharge capacity of the material is at least about 98% of the 5th cycle discharge capacity when discharged at room temperature at a discharge rate of C/3. Additionally, the material can have a tap density of at least 1.8 g/mL.

In some embodiments, the uncoated layered lithium metal oxide composite has a formula of $xLiMO_2 (1-x) Li_2M'O_3$, where M represents one or more metal ions having an average valance of +3 and M' represents one or more metal ions having an average valance of +4, $0<x<1$. For example, the M' can comprise Mn and M can comprise Mn, Co and Ni. In further embodiments, the positive electrode material has a formula $Li_{1+x}Ni_\alpha Mn_\beta Co_\gamma M_\delta O_{2-z}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. In some embodiments, the positive electrode active material can comprise from about 0.1 mole percent to about 4 mole percent metal fluoride, which can be in the form of a coating. In particular, the metal fluoride can comprise $AlF_3$.

In some embodiments, the positive electrode active material has a 20th cycle discharge capacity that is at least about 98.5% of the 5th cycle discharge capacity when discharged at room temperature at a discharge rate of C/3. The 10th cycle discharge capacity of the material can be from about 250 mAh/g to about 310 mAh/g at room temperature at a discharge rate of C/3 when discharged from 4.6 volts to 2.0 volts. In additional embodiments, the material has a $10^{th}$ cycle specific discharge capacity of at least 260 mAh/g at room temperature. In one embodiment, the material has a tap density of at least 2.0 g/mL.

A secondary lithium ion battery can be constructed using a positive electrode comprising the positive electrode active material disclosed herein, a negative electrode comprising a lithium intercalation composition and a separator between the positive electrode and the negative electrode.

DETAILED DESCRIPTION OF THE INVENTIONS

Figure 1:
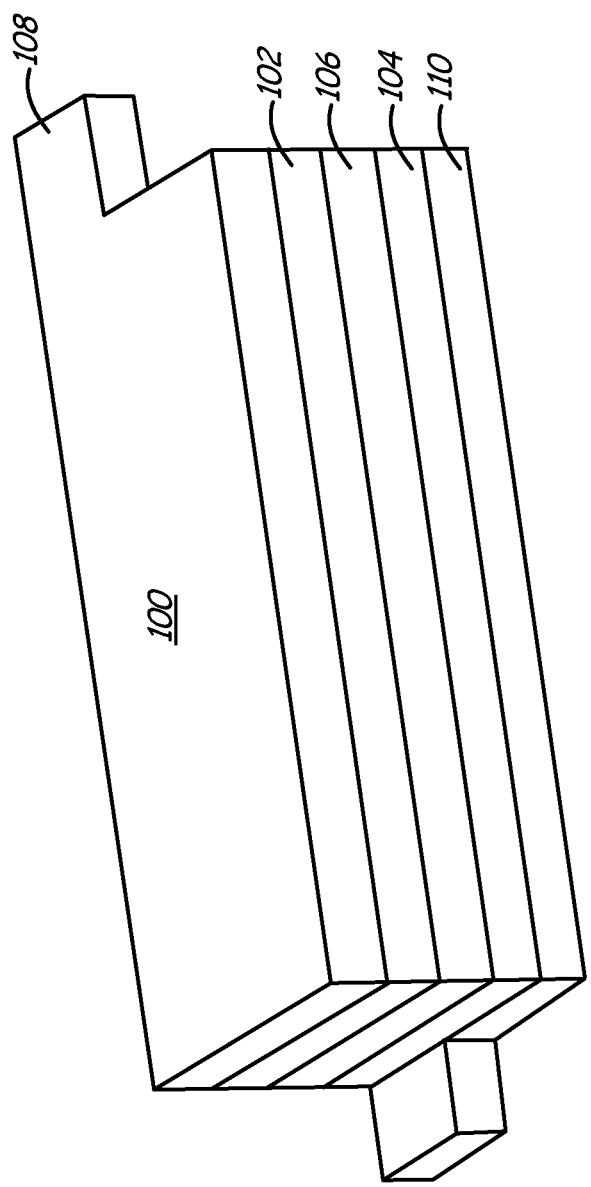
FIG. 1 is a schematic drawing of a battery structure separated from a container.

Lithium ion batteries described herein achieved improved cycling performance while exhibiting high specific capacity and high overall capacity. High specific capacity and high overall capacity positive electrode materials are produced using techniques that yield improved material performance based on techniques that are scalable for commercial production. Suitable synthesis techniques include, for example, co-precipitation approaches. The stoichiometries of the materials of particular interest have desirable properties for commercial applications. The materials have excellent cycling properties and overall capacity as a result of a relatively high tap density combined with a high specific capacity. Use of a metal fluoride coating or other suitable coatings provides further cycling enhancement. The positive electrode materials also exhibit a high average voltage over a discharge cycle so that the batteries have high power output along with a high specific capacity. As a result of the high tap density and excellent cycling performance, the battery exhibit continuing high total capacity when cycled. Furthermore, the positive electrode materials demonstrate a reduced proportion of irreversible capacity loss after the first charge and discharge of the battery so that negative electrode material can be correspondingly reduced if desired. The combination of excellent cycling performance, high specific capacity, and high overall capacity make these resulting lithium ion batteries an improved power source, particularly for high energy applications, such as electric vehicles, plug in hybrid vehicles and the like.

The batteries described herein are lithium ion batteries in which a non-aqueous electrolyte solution comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions.

The lithium ion batteries can use a positive electrode active material that is lithium rich relative to a reference homogenous electroactive lithium metal oxide composition. While not wanted to be limited by theory, it is believed that appropriately formed lithium-rich lithium metal oxides have a composite crystal structure. For example, in some embodiments of lithium rich materials, a $Li_2MnO_3$ material may be structurally integrated with either a layered $LiMnO_2$ component or similar composite compositions with the manganese cations substituted with other transition metal cations with appropriate oxidation states. In some embodiments, the positive electrode material can be represented in two component notation as $x\ Li_2MO_3 \cdot (1-x)LiM'O_2$ where M' is one or more metal cations with an average valance of +3 with at least one cation being $Mn^{+3}$ or $Ni^{+3}$ and where M is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest have a formula $Li_{1+x}Ni_\alpha Mn_\beta Co_\gamma M_\delta O_{2-z}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. In particular, surprisingly good results have been obtained for $Li[Li_{0.2}Ni_{0.175}Co_{0.10}Mn_{0.525}]O_2$, as presented in the examples below for materials synthesized using a carbonate co-precipitation process. High specific capacities with low tap densities were obtained for this composition using other synthesis approaches as described in U.S. application Ser. No. 12/246,814 to Venkatachalam et al. entitled "Positive Electrode Material for Lithium Ion Batteries Having a High Specific Discharge Capacity and Processes for the Synthesis of these Materials", incorporated herein by reference. These compositions have a low risk of fire for improved safety properties due to their specific compositions with a layered structure and reduced amounts of nickel relative to some other high capacity cathode materials. These compositions use low amounts of elements that are less desirable from an environmental perspective, and can be produced from starting materials that have reasonable cost for commercial scale production.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Thackeray et al. in the '143 patent describe the synthesis of layered lithium-rich lithium metal oxides using solid state reactions. Some lithium-rich materials with exclusively lithium, nickel and manganese metals have been formed using a carbonate co-precipitation approach, as described in Lee et al., "High capacity $Li[Li_{0.2}Ni_{0.2}Mn_{0.6}]O_2$ cathode materials via a carbonate co-precipitation method," J. of Power Sources, 162(2006), 1346-1350, incorporated herein by reference. Kang et al. also describes a carbonate co-precipitation process in U.S. Pat. No. 7,435,402 (the '402 patent) entitled "Method and Apparatus for Preparation of Spherical Metal Carbonates and Lithium Metal Oxides for Lithium Rechargeable Batteries", incorporated herein by reference. In the '402 patent to Kang et al., the lithium metal oxide materials synthesized from the carbonate co-precipitation process has moderate specific capacity performance. A carbonate co-precipitation process has been performed for the desired lithium rich metal oxide materials described herein having cobalt in the composition and exhibiting the high specific capacity performance. In addition to the high specific activity, the materials exhibit superior tap density which leads to high overall capacity of the material in fixed volume applications.

As described herein, improved performance has been obtained using co-precipitation approaches with a carbonate intermediate composition, and generally a solution is formed from which a metal carbonate is precipitated with the desired metal stoichiometry. The metal carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the carbonate compositions. As demonstrated in the examples below, the resulting lithium rich metal oxide materials formed with the co-precipitation process have improved performance properties. When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. To compensate for this first cycle irreversible capacity loss, extra electroactive material is included in the negative electrode such that the battery can be fully charged even though this lost capacity is not accessible during most of the life of the battery so that negative electrode material is essentially wasted. The bulk of the first cycle irreversible capacity loss is generally attributed to the positive electrode material.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference.

It has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The amount of coating material can be selected to accentuate the observed performance improvements.

As described herein, the lithium rich positive electrode active materials with the composite crystal structure can exhibit high specific capacity above 235 mAh/g at room temperature with good cycling properties for discharge from 4.6 volts and high tap density above 1.8 g/mL. In general, when specific capacities are comparable, a higher tap density of a positive electrode material results in a higher overall capacity of a battery. A positive electrode material described herein with high tap density in addition to high specific capacity therefore can be used to construct batteries with significantly improved performance. It is important to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33 C. The positive electrode active materials described herein can have a specific discharge capacity of at least about 250 mAh/g at a discharge rate of C/10 at room temperature when discharged from 4.6 volts and tap density above 1.8 g/mL.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation material. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5 < x \leq 1$ or $Li_{1+x}Ti_{2-x}O_4$, $0 \leq x \leq 1/3$. Additional negative electrode materials are described in copending provisional patent applications Ser. No. 61/113,445 to Kumar, entitled "Inter-metallic Compositions, Negative Electrodes with Inter-Metallic Compositions and Batteries," and Ser. No. 61/125,476 to Kumar et al., entitled "Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, ethylene-(propylene-diene monomer) copolymer (EPDM) and mixtures and copolymers thereof.

The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and combinations thereof. Traditionally, the electrolyte comprises a 1 M concentration of the lithium salts.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial battery designs. For example, the cathode compositions can be used for prismatic shaped batteries, wound cylindrical batteries, coin batteries or other reasonable battery shapes. The testing in the Examples is performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Positive Electrode Active Materials

The positive electrode active materials comprise lithium intercalating metal oxide compositions. In some embodiments, the lithium metal oxide compositions can comprise lithium rich compositions that generally are believed to form a layered composite structure. The positive electrode active compositions can exhibit surprisingly high specific capacities and high tap densities in lithium ion battery cells under realistic discharge conditions. The desired electrode active materials can be synthesized using synthesis approaches described herein.

In some compositions of particular interest, the compositions can be described by the formula $Li_{1+x}Ni_\alpha Mn_\beta Co_\gamma M_\delta O_{2-z}F_z$, where x ranges from about 0.05 to about 0.25, $\alpha$ ranges from about 0.1 to about 0.4, $\beta$ range from about 0.4 to about 0.65, $\gamma$ ranges from about 0.05 to about 0.3, $\delta$ ranges from about 0 to about 0.1 and z ranges from about 0 to about 0.1, and where M is Mg, Zn, Al, Ga, B, Zr, Ti, Ca, Ce, Y, Nb or combinations thereof. A person of ordinary skill in the art will recognize that additional ranges of parameter values within the explicit ranges above are contemplated and are within the present disclosure. The fluorine is a dopant that can contribute to cycling stability as well as improved safety of the materials. In embodiments in which z=0, this formula reduces to $Li_{1+x}Ni_\alpha Mn_\beta Co_\gamma M_\delta O_2$. It has been found that suitable coatings provide desirable improvements in cycling properties without the use of a fluorine dopant, although it may be desirable to have a fluorine dopant in some embodiments. Furthermore, in some embodiments it is desirable to have $\delta$=0 such that the compositions are simpler while still providing improved performance. For these embodiments, if z=0 also, the formula simplifies to $Li_{1+x}Ni_\alpha Mn_\beta Co_\gamma O_2$, with the parameters outlined above.

With respect to some embodiments of materials described herein, Thackery and coworkers have proposed a composite crystal structure for some lithium rich metal oxide compositions in which a $Li_2M'O_3$ composition is structurally integrated into a layered structure with a $LiMO_2$ component. The electrode materials can be represented in two component notation as a $Li_2M'O_3$ (1−a) $LiMO_2$, where M is one or more metal elements with an average valance of +3 and with at least one element being Mn or Ni and M' is a metal element with an average valance of +4 and 0<a<1. For example, M can be a combination of $Ni^{+2}$, $Co^{+3}$ and $Mn^{+4}$. The overall formula for these compositions can be written as $Li_{1+x}M'_{2x}M_{1-3x}O_2$. Batteries formed from these materials have been observed to cycle at higher voltages and with higher capacities relative to batteries formed with corresponding $LiMO_2$ compositions. These materials are described further in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest as M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

Recently, Kang and coworkers described a composition for use in secondary batteries with the formula $Li_{1+x}Ni_\alpha Mn_\beta CO_\gamma M'_\delta O_{2-z}F_z$, M=Mg, Zn, Al, Ga, B, Zr, Ti, x between about 0 and 0.3, $\alpha$ between about 0.2 and 0.6, $\beta$ between about 0.2 and 0.6, $\gamma$ between about 0 and 0.3, $\delta$ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. This reference reported a cathode material with a capacity below 250 mAh/g (milli-ampere hours per gram) at room temperature after 10 cycles, which is at an unspecified rate that can be assumed to be low to increase the performance value. It is noted that if fluorine is substituted for oxygen, the oxidation state of the multivalent metals are lower relative to the oxidation state of the compositions without the fluorine. Kang et al. examined various specific compositions including $Li_{1.2}Ni_{0.15}Mn_{0.55}Co_{0.1}O_2$, which is similar to the composition examined in the examples below. The results obtained in the '072 patent involved a solid state synthesis of the materials that did not achieve comparable cycling capacity of the batteries disclosed in the examples below.

The performance of the positive electrode active materials is influence by many factors. The mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode.

Synthesis Methods

Synthesis approaches described herein can be used to form layered lithium rich cathode active materials with improved specific capacity upon cycling and a high tap density. The synthesis methods have been adapted for the synthesis of compositions with the formula $Li_{1+x}Ni_\alpha Mn_\beta Co_\gamma M_\delta O_{2-z}F_z$, ranges from about 0.05 to about 0.25, $\alpha$ ranges from about 0.1 to about 0.4, $\beta$ ranges from about 0.4 to about 0.65, $\gamma$ ranges from about 0.05 to about 0.3, $\delta$ ranges from about 0 to about 0.1 and z ranges from about 0 to about 0.1, and where M is Mg, Zn, Al, Ga, B, Zr, Ti, Ca, Ce, Y, Nb or combinations thereof. The synthesis approaches are also suitable for commercial scale up. Specifically, co-precipitation process can be used to synthesize the desired lithium rich positive electrode materials with desirable results. A lithium fluoride reactant can be added to the reactants, generally along with an appropriate amount of lithium hydroxide, to introduce a fluorine dopant. Alternatively or additionally, a solution assisted precipitation method discussed in detail below can be used to coat the material with metal fluoride.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. The pH of the solution can then be adjusted, such as with the addition of $Na_2CO_3$ and/or ammonium hydroxide, to precipitate a metal carbonate with the desired amounts of metal elements. Generally, the pH can be adjusted to a value between about 6.0 to about 9.0. The solution can be heated and stirred to facilitate the precipitation of the carbonate. The precipitated metal carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal carbonate powder can then be subjected to a heat treatment to convert the carbonate composition to the corresponding oxide composition with the elimination of carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350 ° C. and in some embodiments from about 400 ° C. to about 800 ° C. to convert the carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650 ° C., and in some embodiments from about 700° C. to about 1200° C., and in further embodiments from about 700 ° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate. The powder mixture is then advanced through the heating step(s) to form the oxide and then the crystalline final product material.

Coatings and Methods for Forming the Coatings

Metal fluoride coatings have been found to significantly improve the performance of the lithium rich layered positive electrode active materials described herein. In particular, the cycling properties of the batteries formed from the metal fluoride coated lithium metal oxide have been found to significantly improve from the uncoated material. Additionally, the overall capacity of the batteries also shows desirable properties with the fluoride coating, and the irreversible capacity loss of the first cycle of the battery is reduced. As discussed earlier, first cycle irreversible capacity loss of a battery is the difference between the charge capacity of the new battery and its first discharge capacity. The bulk of the first cycle irreversible capacity loss is generally attributed to the positive electrode material.

The coating provides an unexpected improvement in the performance of the high capacity lithium rich compositions described herein. In general, a selected metal fluoride or metalloid fluoride can be used for the coating. Similarly, a coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. This patent application provides results for $LiCoO_2$ coated with LiF, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. A reduction in irreversible capacity loss was noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference.

It has been found that metal/metalloid fluoride coatings can significantly improve the performance of lithium rich layered compositions for lithium ion secondary batteries as demonstrated in the examples below. The coating improves the capacity of the batteries. However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.01 mole percent to about 10 mole percent, in further embodiments from about 0.1 mole percent to about 7 mole percent, in additional embodiments from about 0.2 mole percent to about 5 mole percent, and in other embodiments from about 0.5 mole percent to about 4 mole percent. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

Battery Performance

Batteries formed from the improved positive electrode active materials described herein have demonstrated superior performance under realistic discharge conditions for moderate current applications. Specifically, the active materials have exhibited high tap density and demonstrated an improved specific capacity upon cycling of the batteries at moderate discharge rates. Furthermore, the coated materials have demonstrated improved cycling out to a large number of cycles. In some embodiments, coated electroactive materials demonstrate a significant reduction in the first cycle irreversible capacity loss relative to the uncoated materials.

In general, various similar testing procedures can be used to evaluate the battery performance. A specific testing procedure is described for the evaluation of the performance values described herein. The testing procedure is described in more detail in the examples below. Specifically, the battery can be cycled between 4.6 volts and 2.0 volts at room temperature, although other ranges can be used with correspondingly different results. The evaluation over the range from 4.6 volts to 2.0 volts is desirable for commercial use since the batteries generally have stable cycling over this voltage range. For the first three cycles, a battery is discharged at a rate of C/10 to establish irreversible capacity loss. The battery is then cycled for three cycles at C/5. For cycle 7 and beyond, the battery is cycled at a rate of C/3, which is a reasonable testing rate for medium current applications. Again, the notation C/x implies that the battery is discharged at a rate to fully discharge the battery to the selected voltage minimum in x hours. The battery capacity depends significantly on the discharge rate, with lose of capacity as the discharge rate increases.

In some embodiments, the positive electrode active material has a specific capacity during the tenth cycle at a discharge rate of C/3 of at least about 235 milliamp hours per gram (mAh/g), in additional embodiments from about 240 mAh/g to about 310 mAh/g, in further embodiments from about 245 mAh/g to about 300 mAh/g and in other embodiment from about 250 mAh/g to about 290 mAh/g. Additionally, the $20^{th}$ cycle discharge capacity of the material is at least about 98%, and in further embodiments 98.5% of the $5^{th}$ cycle discharge capacity, cycled at a discharge rate of C/3. The first cycle irreversible capacity loss for the coated electroactive materials can be decreased at least about 25%, and in further embodiments from about 30% to about 60% relative to the equivalent performance of the uncoated materials. The tap density of the material, which is measured as described below, can be at least about 1.8 g/mL, in further embodiments from about 2 to about 3.5 g/mL and in additional embodiments from about 2.05 to about 2.75 g/mL. High tap density translates into high overall capacity of a battery given a fixed volume. A person of ordinary skill in the art will recognize that additional ranges of specific capacity and tap density and of decreases in irreversible capacity loss are contemplated and are within the present disclosure. For fixed volume applications such as batteries for electronic devices, high tap density therefore high overall capacity of the battery is of particular significance.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Handling or vibration of powdered material can overcome some of the cohesive forces and allow particles to move relative to one another so smaller particles can work their way into the spaces between the larger particles. Consequently, the total volume occupied by the powder decreases and its density increases. Ultimately no further natural particle packing can be measured without the addition of pressure and maximum particle packing has been achieved. While electrodes are formed with the addition of pressure, a reasonably amount of pressure is only effective to form a certain packing density of the electroactive materials in the battery electrode. The actual density in the electrode generally relates to the tap density measured for a powder so that the tap density measurements are predictive of the packing density in a battery electrode with a higher tap density corresponding to a higher packing density in the battery electrode.

Under controlled conditions of tap rate, drop height and container size, the tap density obtained can be highly reproducible. The tap density of a positive electrode active material described herein can be measured by using graduated measuring cylinders on a commercially available tap machine with pre-determined tapping parameters. The specific method for measurement of the tap density for the measurements described herein is provided explicitly in Example 3.

EXAMPLES

The coin cell batteries tested in Examples 1-3 were all performed using coin cell batteries produced following a procedure outlined here. The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell-Riedel-de-Haen) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film using a doctor's blade coating process.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. An example of a positive electrode composition developed using above process having a LMO:acetylene black:graphite:PVDF ratio of 80:5:5:10 is presented below.

The positive electrode was placed inside an argon filled glove box for the fabrication of the coin cell batteries. Lithium foil (FMC Lithium) having thickness of 125 micron was used as a negative electrode. The electrolyte was a 1 M solution of $LiPF_6$ form by dissolving $LiPF_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. All the electrochemical data contained herein have been cycling at three rates, 0.1 C (C/10), 0.2 C (C/5) or 0.33 C (C/3).

Example 1

Reaction of Metal Sulfate with $Na_2CO_3/NH_4OH$ for Carbonate Co-precipitation

Figure 2:
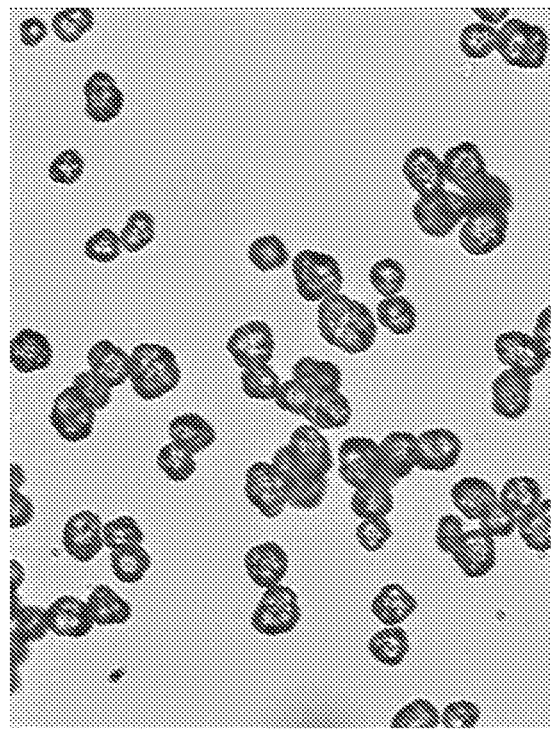
FIG. 2 is a set of optical microscope images of metal carbonate precursor particles from example 1 using a) a 20× and b) a 40× microscope objective, showing morphology of the particles.
Figure 2:
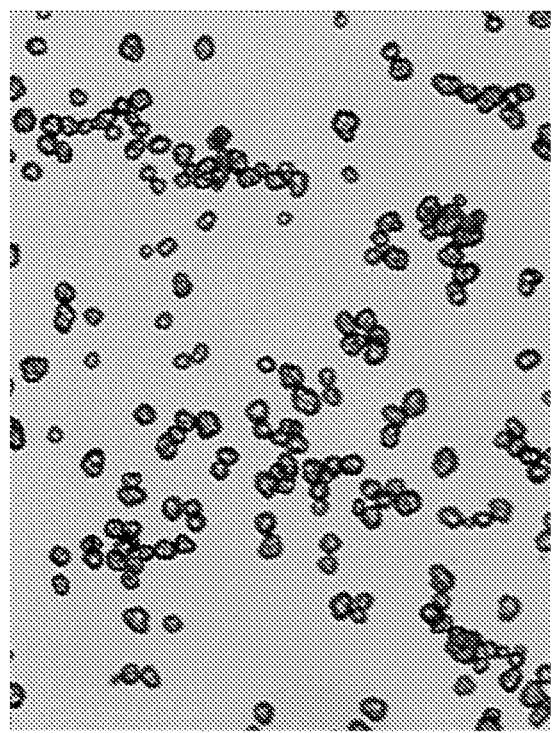

This example demonstrates the formation of a desired cathode active material using a carbonate co-precipitation process. Stoichiometric amounts of metal sulfates ($NiSO_4.xH_2O$, $CoSO_4.xH_2O$, & $MnSO_4.xH_2O$) were dissolved in distilled water to form a metal sulfate aqueous solution. Separately, an aqueous solution containing $Na_2CO_3$ and $NH_4OH$ was prepared. For the formation of the samples, the two solutions were gradually added to a reaction vessel to form metal carbonate precipitates. The reaction mixture was stirred, and the temperature of the reaction mixture was kept at a temperature between room temperature and 80° C. The pH of the reaction mixture was in the range from 6-9. In general, the aqueous metal sulfate solution had a concentration from 1M to 3M, and the aqueous $Na_2CO_3/NH_4OH$ solution had a $Na_2CO_3$ concentration of 1M to 4M and a $NH_4OH$ concentration of 0.2-2M. The metal carbonate precipitate was filtered, washed multiple times with distilled water, and dried at 110° C. for about 16 hrs to form a metal carbonate powder. Optical microscope images of a representative metal carbonate powder is shown in FIG. 2, indicating the precursor particles formed have a substantially spherical shape and are relatively homogenous with respect to size distribution. Specific ranges of reaction conditions for the preparation of the samples are further outlined in Table 1.

TABLE 1

| Reaction Process Condition | Values |
| --- | --- |
| Reaction pH | 6.0-9.0 |
| Reaction time | 0.1-24 hr |
| Reactor type | Batch |
| Reactor agitation speed | 200-1400 rpm |
| Reaction temperature | RT - 80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate powder and thoroughly mixed by a Jar Mill, double planetary mixer, or dry powder rotary mixer to form a homogenous powder mixture. A portion, e.g. 5 grams, of the homogenized powders is calcined followed by an additional mixing step to further homogenize the powder formed. The further homogenized powder was again calcined to form the lithium composite oxide. The product composition was determined to be $Li_{1.2}Ni_{0.175}Co_{0.10}Mn_{0.525}O_2$. Specific ranges of calcination conditions are further outlined in Table 2.

TABLE 2

| | Calcination Process Condition | Values |
| --- | --- | --- |
| $1^{st}$ Step | temperature | 400-800° C. |
| | time | 1-24 hr |
| | protective gas | Nitrogen or Air |
| | Flow rate of protective gas | 0-50 scfh |
| $2^{nd}$ Step | temperature | 700-1100° C. |
| | time | 1-36 hr |
| | protective gas | Nitrogen or Air |
| | Flow rate of protective gas | 0-50 scfh |

Figure 3:
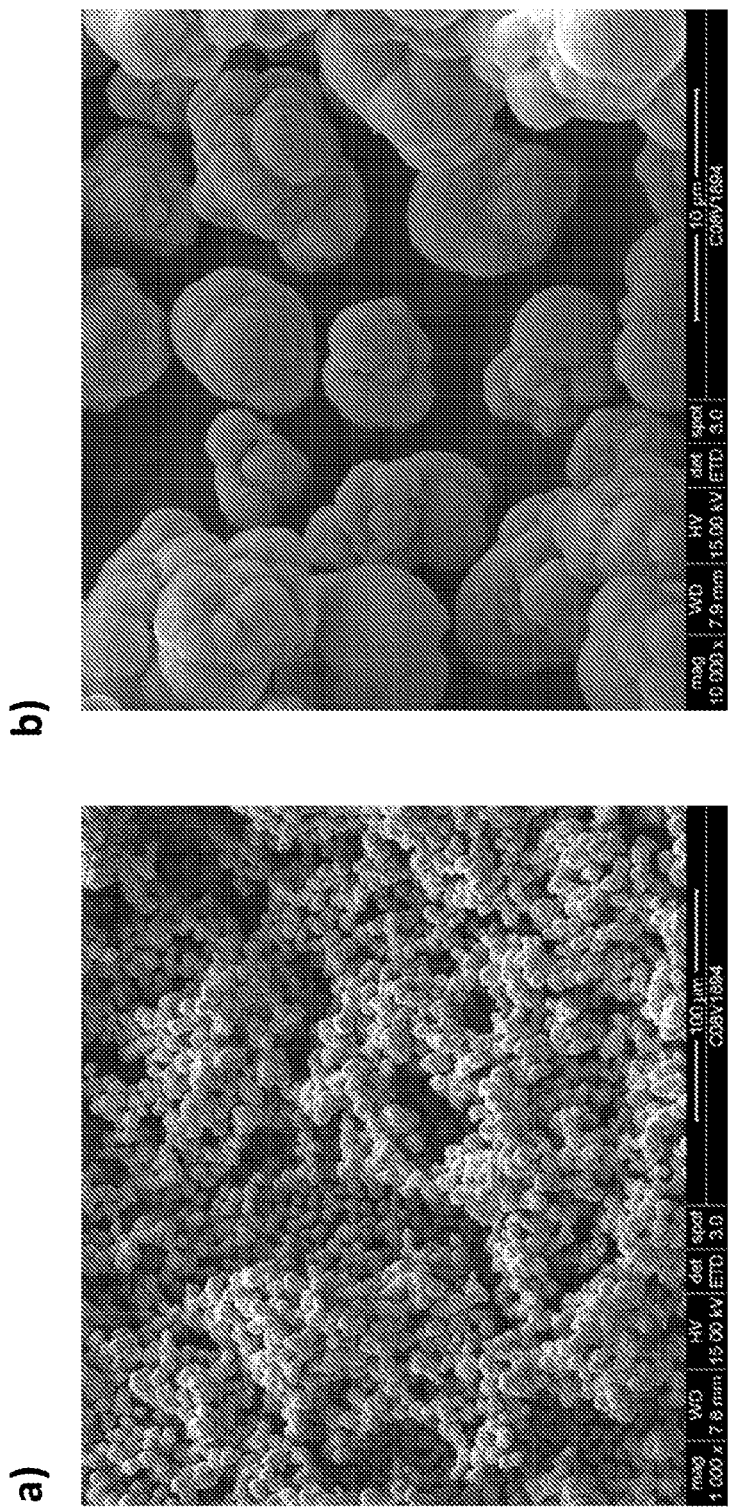
FIG. 3 is a set of SEM micrographs of the lithium metal oxide sample from example 1 at two different magnifications, showing morphology of the particles.
Figure 4:
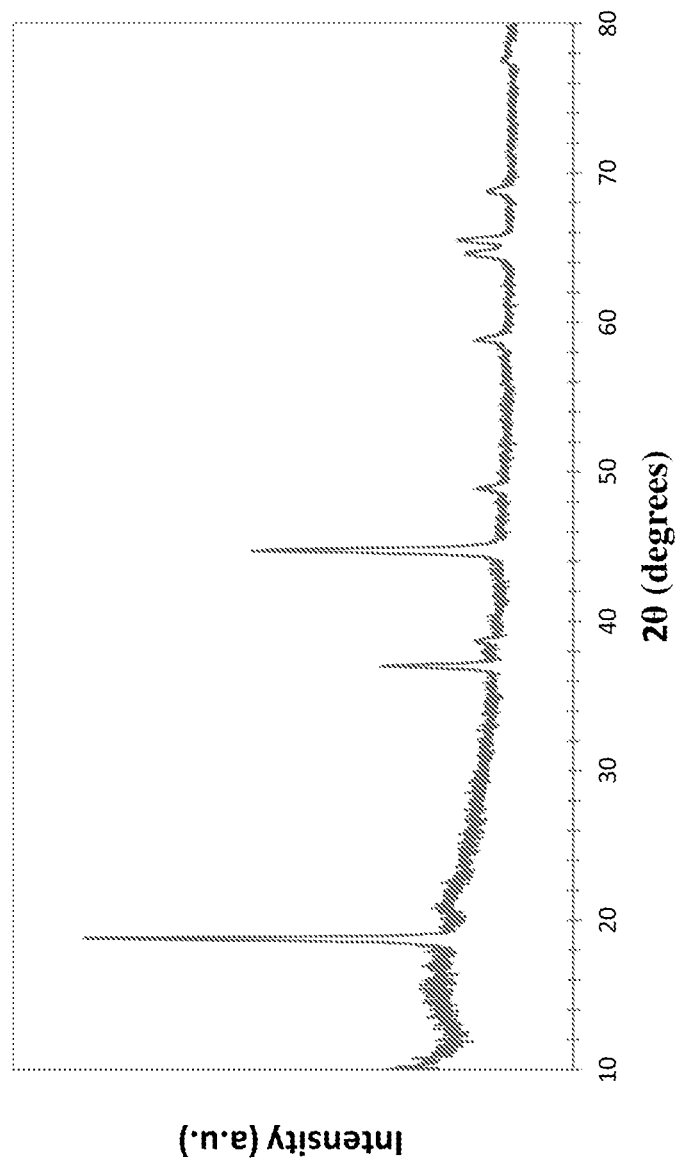
FIG. 4 is an X-ray diffraction pattern of the uncoated lithium metal oxide sample from example 1, showing characteristic of a rock-salt type structure.
Figure 5A:
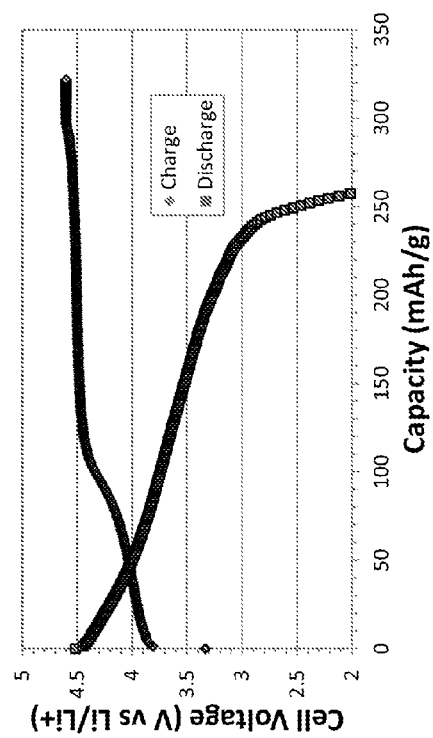
FIG. 5 is a plot of the first cycle charge/discharge voltage versus specific capacities of a battery formed from the sample material described in example 1 cycled at a discharge rate of (a) 0.1 C and (b) 0.33 C respectively in the voltage range of 2.0V-4.6 V.
Figure 5B:
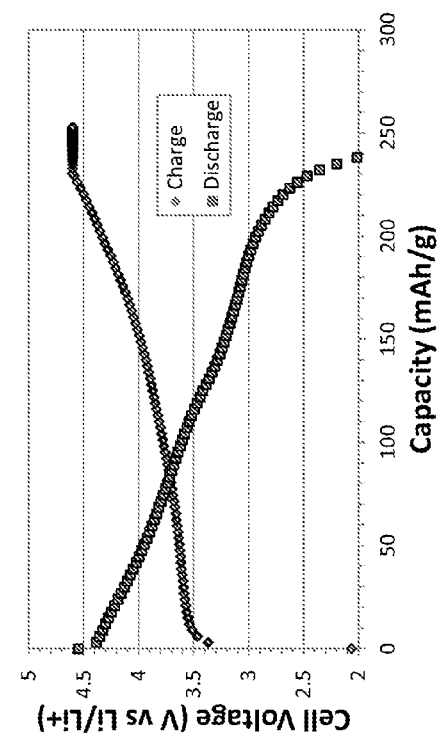
Figure 6:
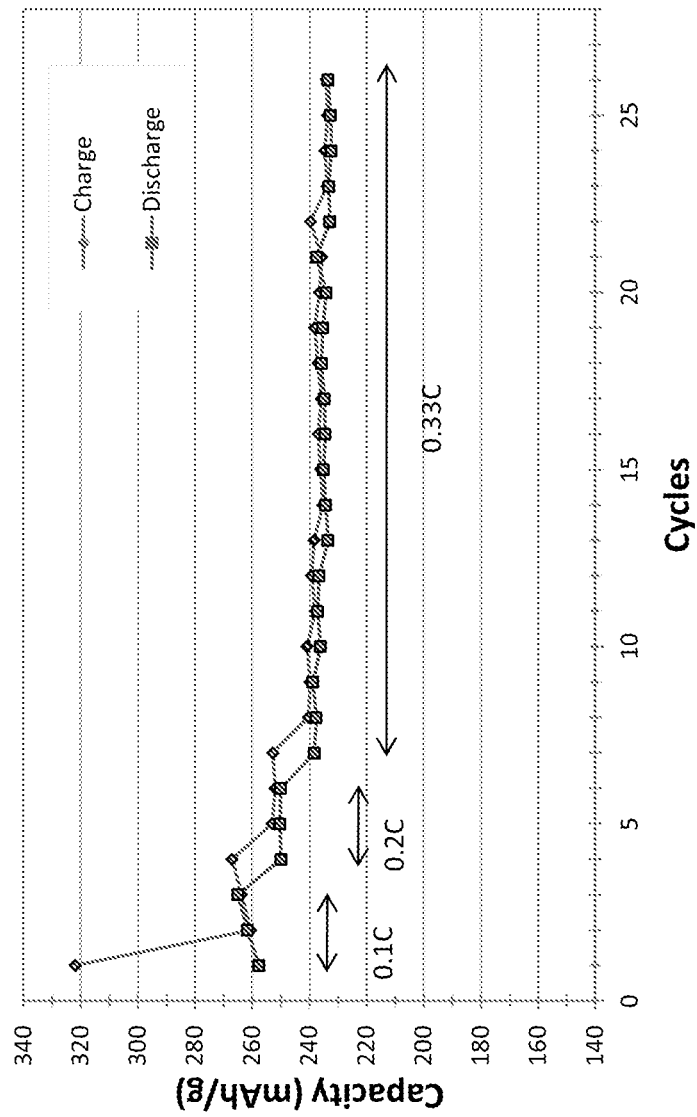
FIG. 6 is a plot of specific capacity versus cycle life for the battery of FIG. 5, showing variation of the discharge capacities as a function of cycle number.

SEM micrograms at different magnifications of the lithium composite oxide are shown in FIG. 3, indicating the particles formed have a substantially spherical shape and are relatively homogenous in size. The x-ray diffraction pattern of the composite powder is shown in FIG. 4, showing characteristics of a rock-salt type structure. The composite was used to form a coin cell battery following the procedure outlined above. The coin cell battery was tested and the plot of voltage versus specific capacity at discharge rate of 0.1 C and 0.33 C of the first cycle are shown in FIGS. 5(a) & (b), respectively. The first cycle specific capacity of the battery at 0.1 C discharge rate is around 255 mAh/g. The first cycle specific capacity of the battery at 0.33 C discharge rate is around 240 mAh/g. Specific capacity versus cycle life of the coin cell battery is also tested and the results are shown in FIG. 6. The first three cycles were measured at a discharge rate of 0.1 C. The next three cycles were measured at a rate of 0.2 C. The subsequent cycles were measured at a rate of 0.33 C.

Example 2

Formation of $AlF_3$ Coated Metal Oxide Materials

The metal oxide particles prepared in the above example can be coated with a thin layer of aluminum fluoride ($AlF_3$) using a solution-based method. For a selected amount of aluminum fluoride coating, appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form aluminum fluoride precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the $AlF_3$ coated metal oxide material.

Figure 7:
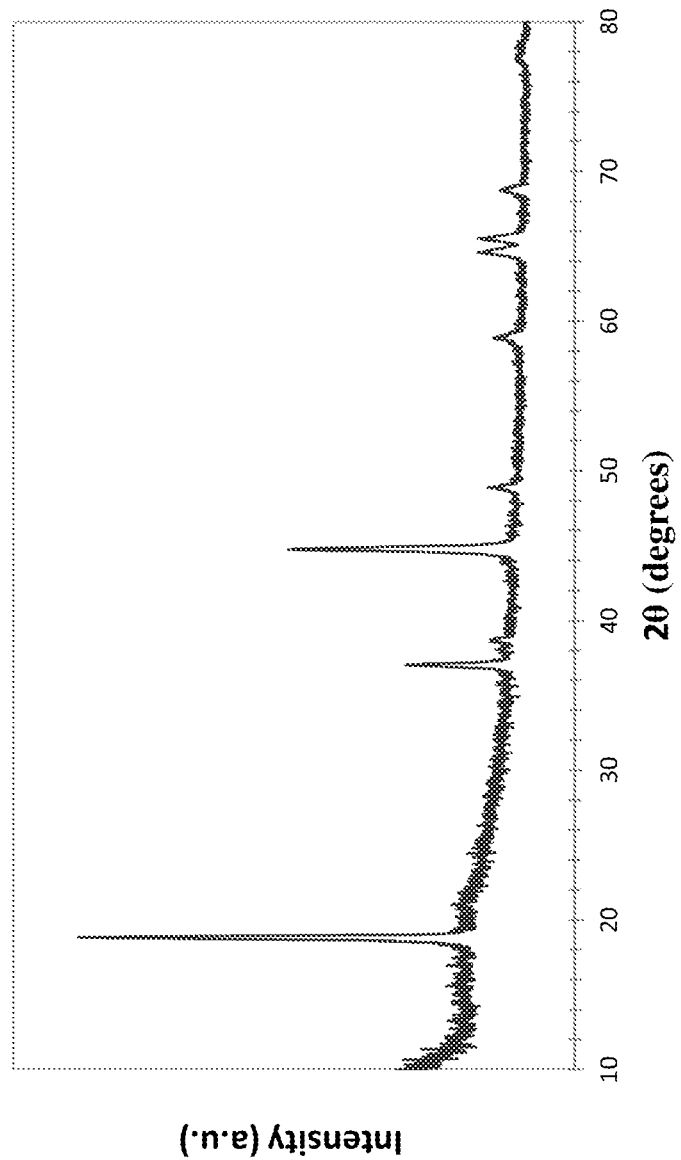
FIG. 7 is an X-ray diffraction pattern of a 1.0 mole % aluminum fluoride coated lithium metal oxide formed from the process of example 2, showing characteristic of a rock-salt type structure.
Figure 8A:
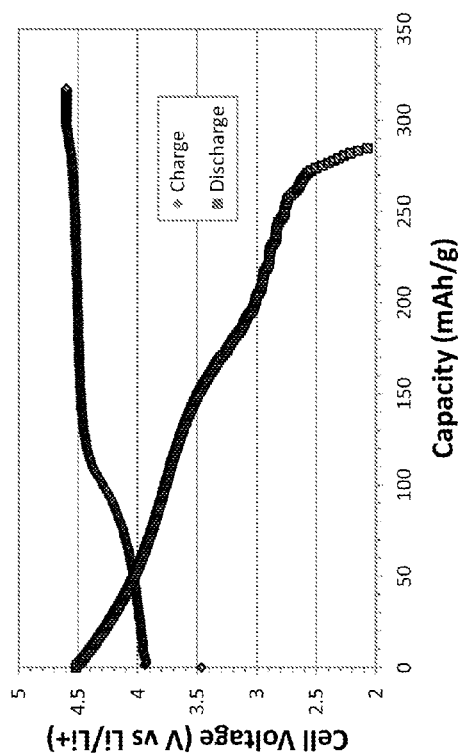
FIG. 8 is a plot of the first cycle charge/discharge voltage versus specific capacities of a battery formed from the sample material described in example 2 cycled at a discharge rate of (a) 0.1 C and (b) 0.33 C, respectively in the voltage range of 2.0V-4.6 V.
Figure 8B:
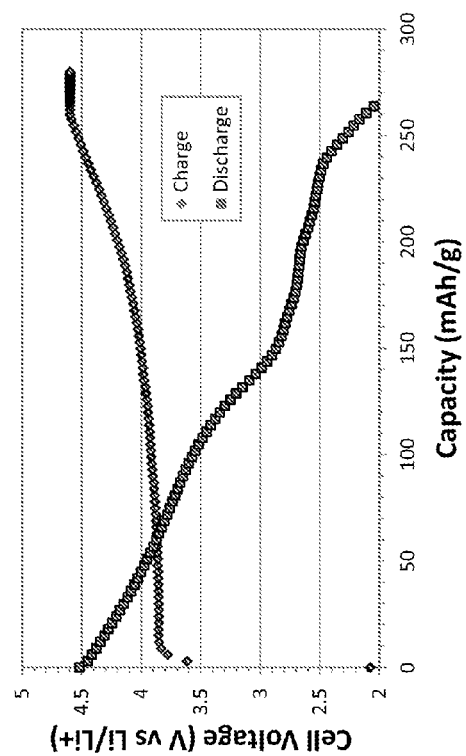
Figure 9:
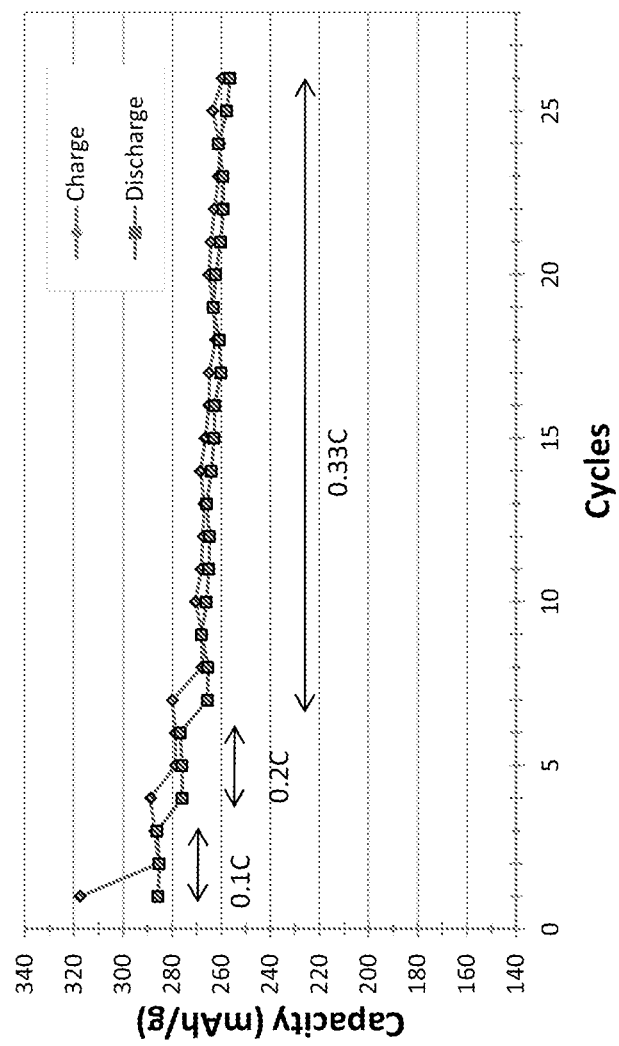
FIG. 9 is a set of plots of specific capacity versus cycle life of the same battery of FIG. 8 showing variation of the discharge capacities as a function of cycle number.
Figure 10:
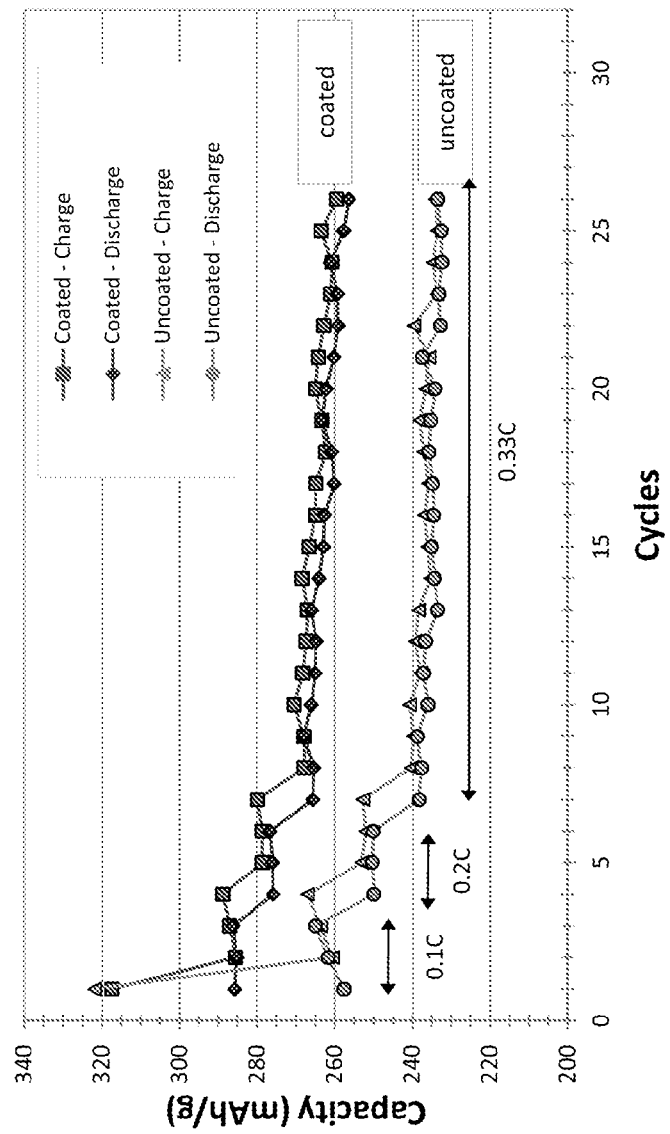
FIG. 10 is a set of plots of specific capacity versus cycle life of batteries formed from the sample material described in example 2 along with the sample material described in example 1, i.e. a 1.0 mole % aluminum fluoride coated metal oxide as well as uncoated metal oxide, respectively.

Specifically, samples of lithium metal oxide (LMO) particles synthesized as described in example 1 were coated with 1.0 mole % aluminum fluoride using the process described in this example. The x-ray diffraction pattern of the 1.0 mole % aluminum fluoride coated LMO sample is shown in FIG. 7. The aluminum fluoride coated LMOs were then used to form coin cell batteries following the procedure outlined above. The coin cell batteries were tested, and the plots of voltage versus specific capacity of the coin cell batteries at discharge rate of 0.1 C and 0.33 are shown in FIG. 8(a) and FIG. 8(b), respectively. The first cycle specific capacity of the battery at 0.1 C discharge rate is around 285 mAh/g. The first cycle specific capacity of the battery at 0.33 C discharge rate is around 265 mAh/g. Specific capacity versus cycle life of the coin cell batteries also tested and the results are shown in FIG. 9. The results are compared to the results of a corresponding uncoated sample and shown in FIG. 10. As shown in FIG. 10, coin cell battery made from sample with 1.0 mole % aluminum fluoride coating has higher capacity than coin cell battery made from uncoated sample. Generally, for testing the coin cell batteries, the first three cycles were measured at a discharge rate of 0.1 C. The next three cycles were measured at a rate of 0.2 C. The subsequent cycles were measured at a rate of 0.33 C.

Irreversible capacity loss (IRCL) of the uncoated and $AlF_3$ coated samples are also compared. As shown in Table 3, uncoated sample has IRCL of 64.26 mAh/g, which is significantly higher than the IRCL of 31.7 mAh/g of 1.0 mole % $AlF_3$ coated sample.

TABLE 3

| | 1st C/10 Charge (mAh/g) | 1st C/10 Discharge (mAh/g) | IRCL (mAh/g) |
|---|---|---|---|
| Uncoated | 321.92 | 257.66 | 64.26 |
| 1% AlF3 coated | 317.49 | 285.78 | 31.71 |

Example 3

Tap Density Results of Different Metal Oxide Materials

An AUTOTAP™ machine from Quantachrome Instruments was used to measure tap density of the samples synthesized in examples 1 and 2. In a typical measurement process, a 4 gram quantity of sample powder was weighed out and placed in a graduated cylinder (10 mL). The cylinder was then mounted on a wheel of the AUTOTAP™ that taps at a tap rate of 260 $min^{-1}$ with a drop height of 3 mm. After 2000 taps the volume of the powder was determined by using the measurement markings on the graduated cylinder. The initial weight of the sample divided by the measured volume after tapping gives the tap density in g/mL unit of the sample. The tap densities of samples prepared as described in Example 1 were measured and the tap densities of 2.0, 2.1 and 2.2 have been obtained. In general, samples with tap density around and above 1.8 g/mL can also have $10^{th}$ cycle specific capacity around and above 235 mAh/g at 0.33 C. In some embodiments, samples with tap density around and above 2.0 g/mL have $10^{th}$ cycle specific capacity around and above 240 mAh/g at 0.33 C.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A positive electrode active material for a lithium ion battery,
    having a $10^{th}$ cycle specific discharge capacity of at least 250 mAh/g at room temperature, a tap density of at least 1.8 g/mL, and substantially spherically shaped particles with substantially uniform size, wherein the specific discharge capacity is determined at a discharge rate of C/3 when discharged from 4.6 volts to 2.0 volts after the material is activated in the first cycle through a charge to 4.6V at a rate of C/10; and
    comprising a composition having an x-ray diffractogram characteristic of a rock-salt type structure and a formula $Li_{1+x}Ni_\alpha Mn_\beta Co_\gamma M''_\delta O_{2-z}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M'' is Mg, Zn, Al, Ga, B, Zr, Ti, Ca, Ce, Y, Nb or combinations thereof.

2. The positive electrode active material of claim 1 wherein the material comprises from about 0.1 mole percent to about 4 mole percent metal fluoride as a coating.

3. The positive electrode active material of claim 2 wherein the metal fluoride comprises $AlF_3$.

4. The positive electrode active material of claim 1 wherein the material has a 10th cycle discharge capacity from about 250 mAh/g to about 310 mAh/g at room temperature at a discharge rate of C/3 when discharged from 4.6 volts to 2.0 volts.

5. The positive electrode active material of claim 1 having a tap density of at least 2.0 g/mL.

6. A secondary lithium ion battery comprising a positive electrode comprising the positive electrode active material of claim 1, a negative electrode comprising a lithium intercalation composition and a separator between the positive electrode and the negative electrode.

7. The positive electrode active material of claim 1 wherein the material has a 20th cycle discharge capacity that is at least about 98.5% of the 5th cycle discharge capacity when discharged at room temperature at a discharge rate of C/3.

8. The positive electrode active material of claim 1 having a $10^{th}$ cycle specific discharge capacity of at least 260 mAh/g at room temperature, wherein the specific discharge capacity is determined at a discharge rate of C/3 when discharged from 4.6 volts to 2.0 volts.

9. The positive electrode active material of claim 1 wherein the positive electrode active material comprises a suitable coating to provide cycling enhancement.

10. The positive electrode active material of claim 9 wherein the first cycle irreversible capacity loss of the positive electrode active material is no more than about ⅔ of the first cycle irreversible capacity loss of the uncoated positive electrode active material, both cycled at discharge rate of C/10.

11. The positive electrode active material of claim 9 wherein the coating comprises $Al_2O_3$.

* * * * *